March 4, 1941. T. F. CARLIN 2,233,399
LATHE
Filed Jan. 9, 1939
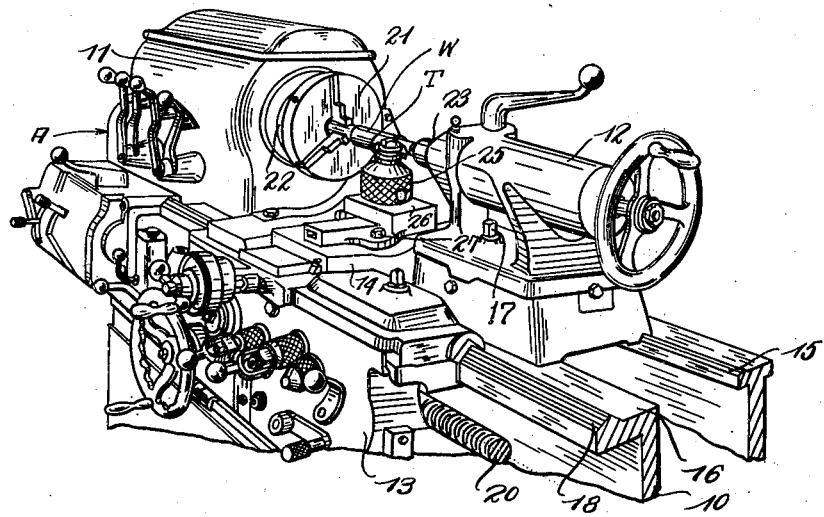
INVENTOR.
THEODORE F. CARLIN
BY
ATTORNEYS Patented Mar. 4, 1941

2,233,399

UNITED STATES PATENT OFFICE 2,233,399

LATHE

Theodore F. Carlin, Cleveland, Ohio, assignor to The Cleveland Hobbing Machine Company, Cleveland, Ohio, a corporation of Ohio Application January 9, 1939, Serial No. 249,940

8 Claims. (Cl. 82—13)

The present invention relates to lathes and, more particularly, attachments therefor whereby work may be turned by disk-like, face-type cutters or tools.

The principal object of the present invention is the provision of a novel attachment for lathes and the like whereby work may be turned by a disk-like, face-type cutter rotated about an axis normal to and offset from the axis of the work, and fed longitudinally of the work blank.

Further objects and advantages of the present invention will be apparent to those skilled in the art to which the invention relates from the following description of the preferred embodiment thereof described with reference to the accompanying drawing, forming a part of this specification, in which similar reference characters designate corresponding parts throughout the several views and in which:

Fig. 1 is a front perspective view of a lathe embodying the present invention;

Fig. 2 is a rear perspective view of the lathe shown in Fig. 1;

Fig. 3 is a plan view, with parts omitted, of the lathe shown in Figs. 1 and 2; and Fig. 4 is an enlarged view of the cutter and work blank.

Referring to the drawing, the reference character A designates generally a lathe comprising a frame 10, including a headstock 11, tailstock 12, tool carriage 13, and cross slide 14. The tailstock 12 is slidably supported on the ways 15 and 16, formed on the top of the frame 10, and is adapted to be clamped in any adjusted position therealong by the member 17. The tool carriage 13 is slidably supported on a way 18, on the top of the frame 10, and on a vertical way (not shown) on the front side of the frame. The tool carriage 13 is adapted to be moved longitudinally of the machine proper by the lead screw 20 and the cross slide 14 is adapted to be adjusted transversely of the machine in the usual manner. The work W is secured at one end in the chuck 21 carried by the work spindle 22 rotatably supported in the headstock 11, and at the other end is supported by the tail center 23 supported in the tailstock 12.

The lathe thus far described is of conventional construction and a further detailed description thereof is unnecessary to a complete understanding of the present invention and will not be given.

According to the provisions of the present invention, the work W is rotated in cutting relation with a face-type, disk-like tool T fixed to the upper end of a tool post 25, rotatably supported in a member or housing 26 detachably secured to the upper surface of the tool slide 14 by the bolts 27. The lower end of the tool post 25 is provided with a gear 28 which is continuously in mesh with a rack 29 formed on a member or bar 30 slidably supported in the housing 26. The rear end of the member 30 is provided with a roller 32 which engages in a box cam C formed in the upper side of a member 33 detachably and adjustably connected to brackets 34 and 35 detachably secured to the headstock 11 and the frame 10, respectively. As the tool carriage 13 is moved toward the left, as viewed in Figs. 1 and 3, by the lead screw 20, the tool T is rotated slowly about its own axis, which is normal to the axis of rotation of the blank and offset therefrom, by the roller 32 travelling along the inclined portions 36, 37 and 38 of the cam C.

Portions of different diameter on the blank are formed by locating the cutting edges of the tool which form these particular portions at various distances from the axis of rotation thereof. In the preferred embodiment of the invention shown, the tool T has two circumferential cutting edges 40 and 41 and a radially extending cutting edge 42, and is adapted to turn a blank having two diameters connected by a right angle shoulder. The circumferential cutting edge 40 turns the portion 43 of the blank, which is the portion of smaller diameter, and the circumferential cutting edge 41 turns the portion 44 of the blank, which is the portion of larger diameter. The radially extending cutting edge 42 turns the shoulder 45 of the blank.

During the turning of the portion 43 of the blank W by the circumferential cutting edge 40 of the tool, the tool is slowly rotated by the roller 32 traveling along the inclined portion 36 of the cam, the inclination of which is such that the cutter or tool T is rotated at a speed slower than that at which it would be rotating if it were rolling along the portion 43 of the blank without slip. During the turning of the shoulder 45 on the blank, the wheel 32 travels along the portion 37 of the cam, the inclination of which is such that the tool is rotated as though it were rolling along the smaller diameter 43 without slip. After the shoulder 45 is formed, the roller 32 travels along the inclined portion 38 of the cam, the inclination of which is substantially the same as the inclination of the portion 36 of the cam.

The size of the tool is maintained within practical limits by causing it to rotate while forming portions of uniform diameter at a speed less than that required to cause it to roll along the blank without slip. The inclination of the portion of the cam traveled by the roller 32 while turning portions of uniform diameter may be varied as desired, the object being to have a maximum operating surface on the tool T while still maintaining the tool within practical limits. However, the inclination of the portion of the cam engaged by the roller, during the formation of a shoulder or the like, is preferably such that the tool is caused to roll along the portion of smallest diameter adjacent thereto without slip. It will also be apparent that the inclination of the radial cutting edge 42 may be varied and the rotation of the tool so determined that any desired shoulder may be generated on the work. The cutting edges of the tool T are provided with the usual rake and the construction is such that the tool may be readily sharpened by grinding the upper surface without changing the relative distances between the cutting edges.

While in the present instance the invention has been applied to turning a rather simple article, it will be apparent that articles of any desired shape can be turned by a proper arrangement of cutting surfaces on the tool T and a proper selection of cam surfaces on the member 33. It is also to be understood that it is not necessary to continuously rotate the tool. The rotation thereof may be intermittent if desired. The work blank may also be operated upon simultaneously by two or more cutters if desired; for example, a roughing cutter might precede a finishing cutter or separate cutters may be employed to form different portions of the work blank.

From the foregoing description of the preferred embodiment of the invention, it will be apparent that the objects heretofore enumerated have been accomplished and that a novel attachment has been provided for lathes whereby work may be turned by a disk-like, face type cutter rotated about an axis normal to and offset from the axis of rotation of the work while being fed longitudinally thereof. While the preferred embodiment of the invention has been described with considerable detail, I do not wish to be limited to the particular construction shown, which may be varied within the scope of the invention. It is my intention to cover hereby all adaptations, modifications and uses of the invention which come within the practice of those skilled in the art to which the invention relates and I particularly point out and claim as my invention the following:

1. An attachment for a lathe comprising a tool carriage movable longitudinally of the work and a cross slide slidably supported on said tool carriage, said attachment comprising a housing or member, a tool spindle rotatably supported in said housing or member, said housing or member being adapted to be detachably secured to the cross slide of the lathe with the axis of rotation of said spindle normal to and offset from the axis of rotation of the work, a cam adapted to be detachably secured to the lathe, and means actuated by said cam for rotating said tool post in predetermined relation to the movement of the tool carriage.

2. An attachment for a lathe comprising a tool carriage movable longitudinally of the work and a cross slide slidably supported by the tool slide for movement transversely of the work, said attachment comprising a housing or member, a tool spindle rotatably supported in said housing or member, said housing or member being adapted to be detachably secured to the cross slide of the lathe with the axis of rotation of said tool spindle normal to and offset from the axis of rotation of the work, a non-uniform cam adapted to be detachably secured to the lathe, and means actuated by said cam upon movement of the tool carriage for rotating said tool post at a non-uniform rate of rotation but in predetermined relation to the movement of the tool carriage.

3. In a lathe, the combination of a frame, means for rotatably supporting a work blank, a tool carriage slidably supported by said frame for movement longitudinally of the work blank, a tool post rotatably carried by said tool carriage for rotation about an axis normal to and offset from the axis of rotation of the work blank, means for moving said tool carriage, a cam supported by said frame, and means actuated by said cam for rotating said tool post in predetermined relation to the movement of the tool carriage.

4. In a lathe, the combination of a frame, means for rotatably supporting a work blank, a tool carriage slidably supported by said frame for movement longitudinally of the work blank, a tool post rotatably carried by said tool carriage for rotation about an axis normal to and offset from the axis of rotation of the work blank, means for moving said tool carriage, a non-uniform cam supported by said frame, and means actuated by said cam for rotating said tool post at a non-uniform rate of rotation but in predetermined relation to the movement of the tool carriage.

5. In a lathe, the combination of a frame, means for rotatably supporting a work blank, a tool slide slidably supported by said frame for movement longitudinally of the work blank, means for moving said tool slide, a tool spindle rotatably supported by said tool slide for rotation about an axis normal to and offset from the axis of rotation of the work blank, a cam supported by said frame, a gear operatively connected to said tool spindle, a rack slidably carried by said tool slide and in mesh with said gear, and means for operatively connecting said rack and said cam.

6. In a lathe, the combination of a frame, means for rotatably supporting a work blank, a tool slide slidably supported by said frame for movement longitudinally of the work blank, means for moving said tool slide, a stationary cam supported by said frame, a tool spindle rotatably carried by said tool slide for rotation about an axis normal to and opposite from the axis of rotation of the work blank, a gear operatively connected to said tool spindle, a rack slidably carried by said tool slide and in mesh with said gear, and means for operatively connected said rack with said cam for rotating said tool spindle upon movement of said tool slide.

7. In a lathe, the combination of a frame, means for rotatably supporting a work blank, a tool slide slidably supported by said frame for movement longitudinally of the work blank, means for moving said tool slide, a tool spindle rotatably supported by said cross slide for rotation about an axis normal to and offset from the axis of rotation of the work blank, a non-uniform cam supported by said frame, a gear operatively connected to said tool spindle, a rack slidably carried by said tool slide and in mesh with said gear, and means for operatively connecting said rack and said cam for rotating said tool spindle at a non-uniform rate.

8. In a lathe, the combination of a frame, means for rotatably supporting a work blank, a tool slide slidably supported by said frame for movement longitudinally of the work blank, means for moving said tool slide, a stationary non-uniform cam supported by said frame, a cross slide slidably supported by said tool slide for movement transversely of the work blank, a tool spindle rotatably supported by said cross slide for rotation about an axis normal to and opposite from the axis of rotation of the work blank, a gear operatively connected to said tool spindle, a rack slidably supported in one of said slides and in mesh with said gear, and means for operatively connecting said rack with said cam for rotating said tool spindle at a non-uniform rate upon movement of said tool slide.

THEODORE F. CARLIN.